Jan. 15, 1952　　　W. W. WYNNE　　　2,582,519
SCREW THREAD UPSETTING TOOL
Filed April 8, 1948
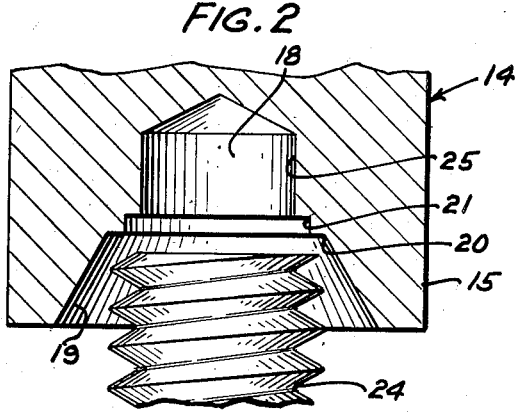
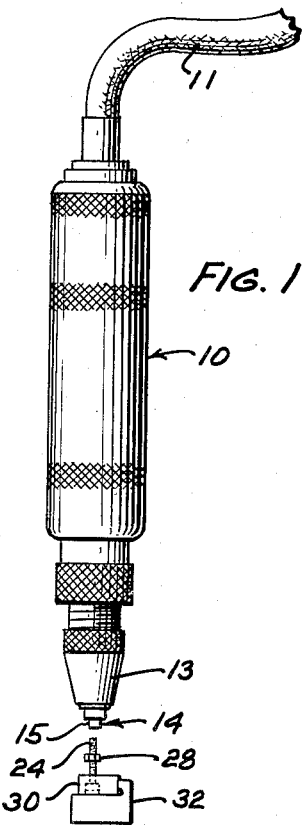
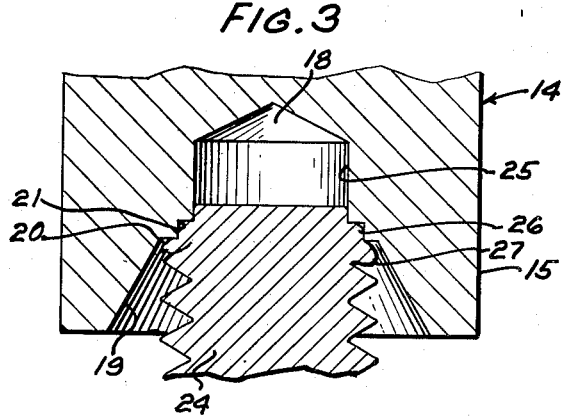
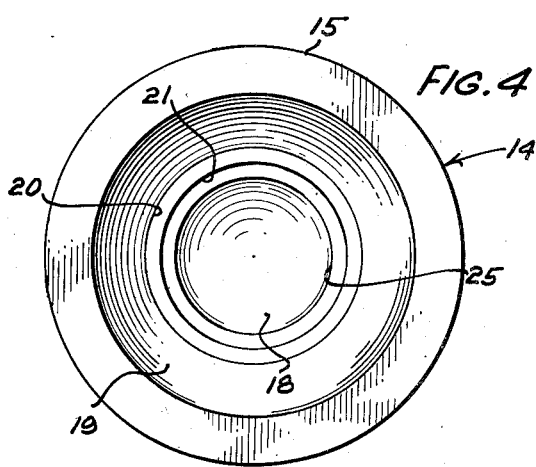
INVENTOR
W. W. WYNNE
BY
ATTORNEY Patented Jan. 15, 1952

2,582,519

UNITED STATES PATENT OFFICE 2,582,519

SCREW THREAD UPSETTING TOOL

Walter W. Wynne, Berwyn, Ill., assignor to Western Electric Company, Incorporated, New York, N. Y., a corporation of New York Application April 8, 1948, Serial No. 19,717

2 Claims. (Cl. 78—53)

This invention relates to a thread upsetting tool and more particularly to such a tool for spinning down or deforming the end threads of a screw-threaded bolt to prevent nuts from being accidentally run off the bolt.

An object of the invention is the provision of a simple and efficient screw thread upsetting tool.

In accordance with the above object, in one embodiment of the invention, particularly designed for spinning or deforming the outer end screw threads, for example, one and one-half screw threads of a bolt having a nut previously positioned thereon to prevent it from freely running off, there is provided a screw thread upsetting tool comprising a body member which, at its mounting end, may be clutched to a rotary driving member. At its working end, the tool is of circular cross-section and provided with a circular depression which is formed at its open end with a conical guiding surface terminating in stepped annular shouldered surfaces having diameters corresponding, respectively, to the major and pitch diameters of the screw threads to be deformed. The depth of the last step is so dimensioned that it is equal to at least one-half of the pitch of the screw thread and the depression terminates in a clearance diameter equal to the minor diameter of the screw thread.

Other objects and advantages of the invention will more fully appear from the following detailed description taken in conjunction with the accompanying drawing, in which Fig. 1 is an elevational view of a rotary screw thread upsetting tool embodying the features of this invention shown clutched to a portable air driven power unit and in position to engage the end face of a screw-threaded bolt;

Fig. 2 is an enlarged fragmentary central longitudinal section through the tool shown in Fig. 1 just before engaging the end face of a bolt;

Fig. 3 is a similar view of the tool and bolt upon completion of a screw-thread upsetting operation on the end screw threads of the bolt, the bolt being shown in section; and Fig. 4 is a bottom plan view of the tool.

Referring to the drawing and more particularly to Fig. 1, one embodiment of the invention is shown applied, for example, to a conventional type portable air driven tool 10, the air for driving the rotor of the tool (not shown) being supplied by means of a hose 11, which may be connected to a source of air under pressure. At its lower end, the tool 10 has a chuck 13 for supporting a screw thread upsetting or spinning tool 14 embodying the features of this invention.

The spinning tool 14, referring now to Figs. 2, 3, and 4, which fragmentarily illustrates the lower end of the tool on a greatly enlarged scale compared to the tool as shown in Fig. 1, comprises a body member which, at its lower or working end 15, is of circular cross-section, the upper or mounting end (not shown) being of reduced diameter and of irregular cross-section for insertion in the chuck 13. At the working end 15 of the tool there is provided a circular depression 18 having several diameters. The open end of the depression 18 is formed with a conical mouth or guiding surface 19, which terminates in two stepped annular shouldered surfaces having diameters, indicated at 20 and 21, corresponding to the major and pitch diameters, respectively, of a screw-threaded bolt 24, the outer end threads of which are to be upset or deformed by spinning. The depth of the last step, having the diameter indicated at 21, is equal to at least one-half of the pitch of the screw thread of the bolt 24. A clearance diameter is preferably provided at the inner end of the depression 18, as indicated at 25, which should be approximately equal to the minor diameter of the screw thread of the bolt 24.

In using the spinning tool 14, it is driven at high speed, for example, 2500 R. P. M., and high torque by the air driven tool 10, and may be lowered by the operator and guided by the conical surface 19 of the tool into axially aligned engagement with the upper end of the screw-threaded bolt 24, as shown in Figs. 1 and 2. By exerting suitable longitudinal pressure on the tool 10, while the spinning tool 14 is engaged with the screw threaded end of the bolt 24 and is being driven at high speed with a high torque, the end threads, or preferably one and one-half threads of the bolt, will be spun or deformed sufficiently out of normal position, as indicated at 26 and 27 (Fig. 2) and completely around the bolt to prevent a nut 28 (Fig. 1) previously positioned on the bolt from freely turning or running off the bolt.

In the particular example chosen for illustration, the spinning tool 14 is shown deforming the screw threads of a bolt 24, which has been assembled with a strip or block 30, the screw-threaded end of the bolt extending from the block and having a nut 28 threaded onto it. As thus assembled with the bolt 24 and nut 28, the block 30 is mounted as shown on an L-shaped support 32 to prevent it from rotating and provide a firm base whereby when the tool is engaged with the end of the bolt, the threads will be deformed as illustrated in Fig. 3.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:

1. An upsetting tool comprising a cylindrical body having an upsetting cavity in its free end, said cavity being defined by a funnel shaped guiding entrance, an annular upsetting shoulder extending transversely of said body at the inner end of said funnel entrance, a cylindrical wall concentric with said body and extending inwardly from the inner periphery of said annular shoulder, a second annular upsetting shoulder extending transversely of said body at the inner end of said cylindrical wall, and a second cylindrical wall concentric with said body extending inwardly from the inner periphery of said second annular shoulder to the bottom of said cavity.

2. A spinning tool for upsetting the end threads of an exteriorly threaded member comprising a body member rotatable about its axis and having an upsetting cavity at its free end coaxial with said axis, said cavity being defined by a funnel shaped guiding entrance, an annular upsetting shoulder extending transversely of said axis at the inner end of said funnel shaped entrance, an annular wall extending inwardly from the inner periphery of said annular shoulder in concentric relation to said axis, a second annular upsetting shoulder extending transversely of said axis at the inner end of said annular wall, and a second annular wall concentric with said axis extending inwardly from the inner periphery of said second annular shoulder.

WALTER W. WYNNE.

REFERENCES CITED

The following references are of record in the file of this patent:

UNITED STATES PATENTS

| Number | Name | Date |
|---|---|---|
| 1,417,711 | Becker et al. | May 30, 1922 |
| 1,764,641 | Oesterle | June 17, 1930 |
| 1,773,410 | Selah | Aug. 19, 1930 |
| 2,183,641 | Double | Dec. 19, 1939 |
| 2,347,219 | Schnell | Apr. 25, 1944 |

FOREIGN PATENTS

| Number | Country | Date |
|---|---|---|
| 8,331 | Great Britain | May 30, 1913 |